Aug. 12, 1952 A. M. LEVINE 2,607,035
PULSE MULTIPLEX TRANSMISSION SYSTEM
Filed Dec. 19, 1949
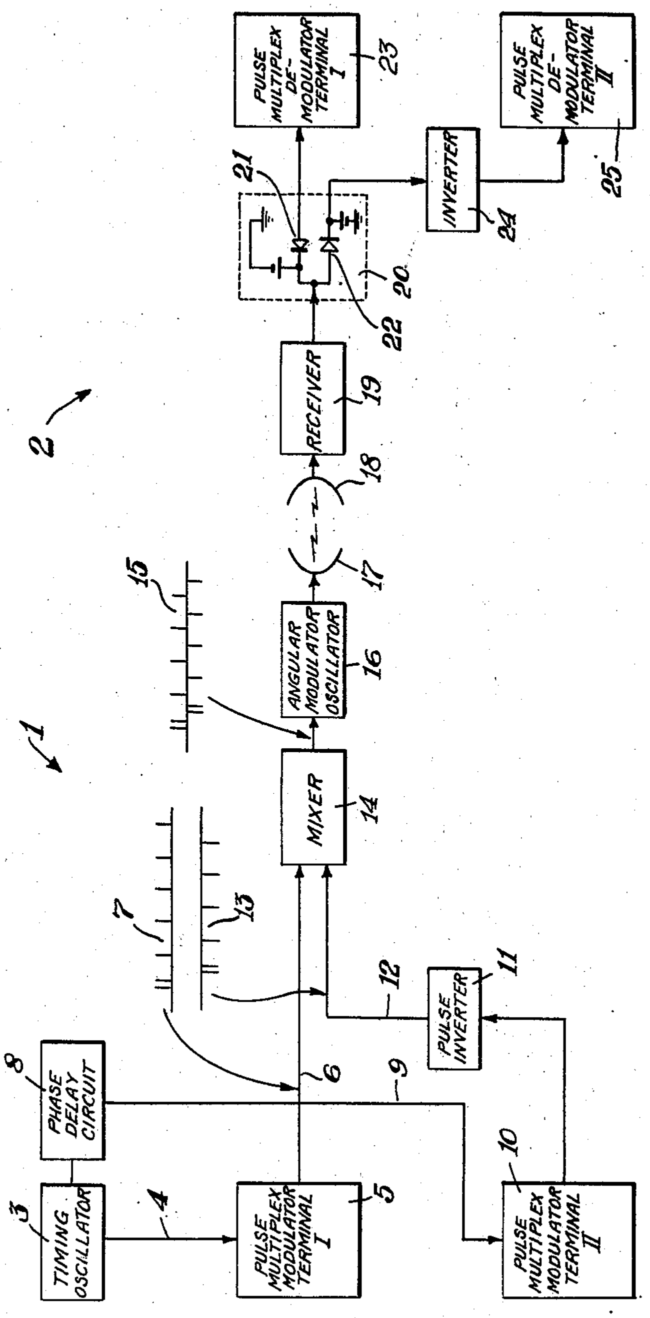
INVENTOR
ARNOLD M. LEVINE
BY R. P. Morris
ATTORNEY Patented Aug. 12, 1952

2,607,035

UNITED STATES PATENT OFFICE 2,607,035

PULSE MULTIPLEX TRANSMISSION SYSTEM

Arnold Milton Levine, River Edge, N. J., assignor, by mesne assignments, to Federal Telephone and Radio Corporation, Clifton, N. J., a corporation of Delaware Application December 19, 1949, Serial No. 133,876

7 Claims. (Cl. 343—203)

This invention relates to multiplex transmission systems and more particularly to multiplex transmission systems of the type in which various channels are indicated by discrete time spaced energy pulses.

Various types of pulse multiplex systems have been proposed wherein intelligence is conveyed by pulses modulated in amplitude, time duration or pulse code combinations. In these systems where it is desired to transmit the pulses by carrier for the purpose of radiation or for other types of carrier transmission, a carrier wave may be modulated by these pulses either in phase or frequency. Such systems have been installed in various locations and the terminal equipment and repeaters are presently designed for a given carrier frequency operation. As traffic increases it may become necessary to increase the number of channels transmitted by a given carrier. If this is done by interposing additional channels in the spacing between the pulse already in use considerable trouble, due to cross modulation, may occur. It has already been proposed to reduce this cross modulation by separately modulating two trains of pulses so that for example the odd pulses are modulated in one modulator and the even pulses in a separate modulator. These separate trains then being combined so as to space the pulses of one modulator in the time interval intermediate the pulses from the other modulator. This reduces cross modulation or cross talk introduced in the modulators systems but still troublesome cross talk may arise in the other parts of the transmission system.

It is an object of this invention to provide a system which will double the capacity of a carrier transmission system without the addition of other carrier frequencies and to minimize the cross talk in such a system.

According to a feature of my invention two separate trains of pulses are individually modulated in separate pulse modulators. The pulses from one of these modulators are inverted in polarity with respect to the pulses of the other train and these two trains of pulses are then used to angularly modulate a source of carrier frequency. This angular modulation may be either frequency or phase modulation. Thus the common carrier may carry both messages. At the receiver end of the system the angularly modulated carrier is received and discriminated to reproduce the original modulating pulse pattern. Pulses of the two patterns are then separated for example in a clipper separator. One of these trains of pulses may be then inverted and the two trains applied to separate pulse demodulator equipment. It will be recognised that with such a system the terminal equipment may be simply duplicated at each terminal to provide the extra channels, the additional equipment required merely being the necessary phasing circuit for the modulation, the inverter circuits, the mixer circuits and the segregating circuits.

The above-mentioned and other features and objects of this invention and the manner of attaining them will become more apparent and the invention itself will be best understood by reference to the following description of an embodiment of the invention taken in conjunction with the accompanying drawings, wherein:

A single figure illustrates in block schematic form a system incorporating the features of this invention.

Turning to the figure, reference character 1 represents generally a transmitter circuit incorporating a feature of this invention and numeral 2 a receiver circuit incorporating the features of my invention. In transmitter 1 there is provided a timing oscillator 3 which supplies energy over line 4 to a pulse multiplex modulator terminal 5 for providing a multi-channel pulse modulated train at its output 6 as indicated above curve 7. Output energy from timing oscillator 3 may also be applied to a phase delay circuit 8 and over line 9 to a second pulse multiplex modulator terminal 10. Modulator 10 may be identical with modulator 5 and may be of any of the known forms. The output from pulse modulator 10 is applied to a pulse inverter 11 and hence to line 12 in the form of a train of pulses generally indicated at 13. Lines 6 and 12 are coupled to a mixer 14 to combine two trains 7 and 13 into a common pulse train 15. This pulse train 15 is applied to an oscillator 16 to angularly modulate the carrier energy from the oscillator. This angular modulation may be in the form of any known type of phase or frequency modulation. The output of oscillator 16 is then applied to a transmitting medium for instance by application to the directive radiator 17. It will be understood that the phase shift or frequency shift in oscillator 16 is substantially the same for each pulse but is in opposite directions for the pulses of trains 7 and 13.

The modulated carrier wave may be received on a directive antenna 18 and applied to a receiver 19 where the wave is frequency or phase discriminated to produce in the output of the receiver a pulse train substantially identical with the pulse train 15. If necessary any desired shaping or regenerating networks may also be included in receiver 19. This discriminated pulse train is then applied to a clipper separator 20, diagrammatically illustrated as biased rectifiers 21 and 22. Biased rectifier 21 passes only positive pulses corresponding to train 7 while 22 passes only the negative pulses corresponding to train 13. The pulse output from rectifier 21 is applied to a pulse multiplex demodulating terminal 23. The output train from clipper 22 is applied over inverter 24 to a second pulse multiplex demodulator terminal 25 which may be identical to the demodulator terminal 23. Since the operation of circuits for such demodulator terminals are well known the details thereof have not been illustrated herein.

It will be readily recognised that any of the types of pulse multiplex modulators and demodulators may be used, for example, they may consist of the time displacement or pulse time modulator circuits. Instead of pulse time modulation it is clear that pulse duration or width modulation, pulse code modulation or pulse amplitude modulation systems may be provided as required. With the use of the system herein described the numbers of channels transmitted may be doubled without the addition of further carrier sources. Likewise, since the pulses of trains 7 and 13 are of opposed polarity they will have less effect one on another and, therefore, the degree of cross talk is substantially reduced.

Many modifications of this invention will readily present themselves to those skilled in the art.

While I have described above the principles of my invention in connection with specific apparatus, it is to be clearly understood that this description is made only by way of example and not as a limitation to the scope of my invention.

What I claim is:

1. A carrier transmission system comprising a plurality of different signalling channels, means for producing in response to the signals of said channels, a train of pulses of which adjacent pulses are modulated in accordance with the signal of different ones of said signal channels, a plurality of additional different signalling channels, means for producing in response to the signals of said additional different channels, a train of pulses of which adjacent pulses are modulated in accordance with the signal of different ones of said additional signal channels, means for time displacing the pulses of one of said trains of pulses to occur in the time interval between the adjacent pulses of the other train, means for inverting in polarity the pulses of one of said train of pulses with respect to the polarity of the pulses of said other train of pulses, a carrier wave source, and means for applying both trains of pulses to said carrier wave source so that the pulses of each train angularly modulate said carrier wave in a direction opposite to that of the pulses of the other train.

2. A carrier transmission system according to claim 1, wherein the source is an oscillator and said pulse trains are applied to said oscillator to frequency modulate said oscillator.

3. A carrier transmission system according to claim 1, wherein said carrier wave source is an oscillator and said pulse trains are applied to said oscillator to phase modulate said oscillator.

4. A carrier transmission system for transmitting two trains of pulses, adjacent pulses of repeated groups of each train representing different signal channels comprising means for time displacing the pulses of one of said trains of pulses to occur in the time interval between the adjacent pulses of the other train, means for inverting in polarity the pulses of one of said train of pulses with respect to the polarity of the pulses of said other train of pulses, a carrier wave source, and means for applying both trains of pulses to said carrier wave source to angularly modulate said carrier wave in opposite directions by said separate trains of pulses; and a receiver comprising means for receiving said angularly modulated carrier, discriminator means to detect said modulated carrier to reproduce said pulse trains and means to separate said pulse trains in accordance with the polarity of said pulses.

5. A carrier transmission system according to claim 4, further comprising means for inverting the polarity of the pulses of one of said reproduced pulse trains and translator means for translating the separate pulses of each of said trains.

6. A carrier transmission system according to claim 4, wherein said means to separate said pulses comprises clipper circuits each biased to pass pulses of one polarity only.

7. In a carrier transmission system wherein the carrier is angularly modulated with pulses of two pulse trains, the pulses of one train being inverted in polarity with respect to the polarity of the pulses of the other train, means for receiving said angularly modulated carrier, discriminator means to detect said modulated carrier to reproduce said pulse trains, means to separate said pulse trains in accordance with the polarity of said pulses, means for inverting the polarity of the pulses of one of said reproduced pulse trains and translator means for translating the separate pulses of each of said trains.

ARNOLD MILTON LEVINE.

REFERENCES CITED

The following references are of record in the file of this patent:

UNITED STATES PATENTS

| Number | Name | Date |
|---|---|---|
| 2,076,918 | Luck | July 13, 1937 |
| 2,401,406 | Bedford et al. | June 4, 1946 |
| 2,426,225 | Krause | Aug. 26, 1947 |
| 2,515,452 | Kaufman | July 18, 1950 |

FOREIGN PATENTS

| Number | Country | Date |
|---|---|---|
| 467,095 | Great Britain | June 7, 1937 |